United States Patent [19]

Patel

[11] Patent Number: 5,782,491
[45] Date of Patent: Jul. 21, 1998

[54] ADJUSTABLE MOUNTING FOR SEAT BELT GUIDE

[75] Inventor: Rasik N. Patel, Canton, Mich.

[73] Assignee: Ford Global Technologies, Inc., Dearborn, Mich.

[21] Appl. No.: 934,028

[22] Filed: Sep. 19, 1997

Related U.S. Application Data

[63] Continuation of Ser. No. 587,054, Jan. 16, 1996, abandoned.

[51] Int. Cl.$^6$ .................................................. B60R 22/20
[52] U.S. Cl. ...................... 280/801.2; 280/808; 280/486
[58] Field of Search .......................... 280/801.1, 801.2, 280/808; 297/464, 483, 486

[56] References Cited

U.S. PATENT DOCUMENTS

| | | | |
|---|---|---|---|
| Re. 32,524 | 10/1987 | Temple | 280/801.2 |
| 3,957,282 | 5/1976 | Finnigan. | |
| 4,560,204 | 12/1985 | Zeiimer et al. | |
| 4,564,219 | 1/1986 | Baden et al. | |
| 4,573,708 | 3/1986 | Brorsson. | |
| 4,834,427 | 5/1989 | Takada | 297/483 |
| 5,096,224 | 3/1992 | Murakami et al. | |
| 5,215,332 | 6/1993 | De Sloovere. | |

FOREIGN PATENT DOCUMENTS

| | | | |
|---|---|---|---|
| 3627087 | 3/1988 | Germany | 280/801.2 |
| 1497397 | 1/1978 | United Kingdom | 280/801.2 |

Primary Examiner—Eric D. Culbreth
Attorney, Agent, or Firm—Daniel M. Stock

[57] ABSTRACT

An adjustable mounting mechanism is provided for an automotive seat belt assembly which employs an energy absorbing cushion locally overlying the mounting bolt joining the seat belt assembly to a vehicle body pillar. The cushion is carried in a moveable trim portion which operates to move the mounting bolt vertically while maintaining juxtaposed relationship between the cushion and the mounting bolt.

12 Claims, 2 Drawing Sheets

ADJUSTABLE MOUNTING FOR SEAT BELT GUIDE

This application is a continuation of application Ser. No. 08/587,054, filed Jan. 16, 1996, now abandoned.

BACKGROUND OF THE INVENTION

1. Field of the Invention

The present invention relates generally to automotive vehicle seat belt assemblies, and more specifically to such assemblies that include vertically adjustable guide rings and to arrangements for mounting such guide rings.

2. Description of Related Art

The most widely used occupant restraint systems for automotive vehicles employ a three point continuous loop seat belt assembly in which one end of the seat belt is fixed at or near the floor of the vehicle in a retractor, the other end is selectively coupled to a buckle adjacent the seated position of an occupant, and an intermediate portion of the belt is supported above and laterally displaced from the occupant on the vehicle body. This latter support is typically effected through a guide ring pivotably mounted on the body.

To enhance the convenience of occupants in using such systems, it is known to mount the guide ring for vertical movement with respect to the vehicle body and the occupants to permit adjustment for comfort in wearing the belt. U.S. Pat. No. 4,564,219 is exemplary of such mountings.

It is also desirable in the design of vehicle interiors in which massive structures are utilized in mounting load carrying structure to provide energy absorbing devices facing inwardly with respect to the vehicle interior and overlying the massive structures. The variable vertical positioning of guide rings presents a heretofore unaddressed design constraint.

Cushioning vehicle interiors is well known, but since excess outlay of material must be avoided to reduce overall vehicle weight, cushioning a moving massive structure may require a large outlay in cushioning structure.

SUMMARY OF THE INVENTION

Responsive to this design constraint and to the deficiency of the prior art in meeting this constraint, the present invention provides an adjustable mounting mechanism for a seat belt guide ring carried within the body of an automotive vehicle which has a vertically extending track mounted on the interior of the body of the vehicle; a mounting bolt assembly slidably mounted on the track and selectively vertically moveable therealong between descrete vertical positions and including a bolt projecting inwardly with respect to the vehicle body and carrying a guide ring thereon; a trim panel assembly mounted in overlying relationship with respect to the track and the mounting bolt assembly and including a fixed portion mounted on the interior of the vehicle body and a moveable portion slidably engaging said fixed portion and having an inner side drivingly engageable with the bolt to selectively effect vertical movement of the mounting bolt assembly along the track; and a cushion member carried with the moveable portion in facing relationship with the bolt.

Advantageously, the present invention includes a seat belt assembly that provides an energy absorbing structure moveable in juxtaposition with the mounting structure of a guide ring assembly, avoiding the excessive outlay of material attendant the provision of a static energy absorbing structure sized to cover the vertical movement of the guide ring mounting structure.

BRIEF DESCRIPTION OF THE DRAWINGS

This and other advantages of the present invention will be apparent to those skilled in the automotive vehicle occupant restraint arts on reading the following description with reference to the accompanying drawings in which:

FIG. 3 is a cross section through the pillar of FIG. 1 illustrating the mounting of the guide ring assembly;

DESCRIPTION OF THE PREFERRED EMBODIMENTS

Figure 1:
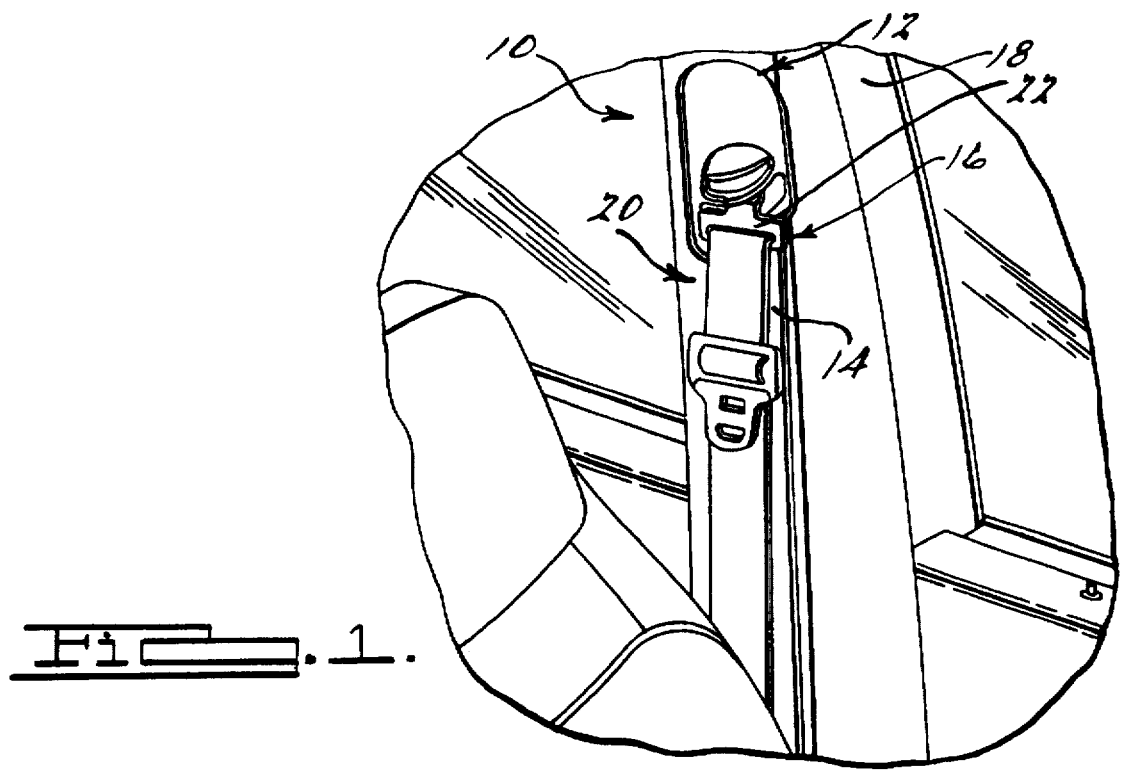
FIG. 1 is a perspective view of a seat belt assembly embodying the present invention installed on automotive vehicle body pillar.

Turning now to the drawings, and in particular in FIG. 1 thereof, an automotive vehicle body interior indicated generally at 10 is illustrated as including a seat belt assembly 12 that includes a seat belt 14 carried on a guide ring assembly 16. The guide ring assembly 16 is mounted for vertical movement with respect to a pillar 18 of the vehicle body 10 in a manner to be later described. The guide ring assembly 16 is mounted for vertical movement with respect to the pillar 18 and is covered by a trim cover assembly 20 throughout its vertical travel.

Figure 2:
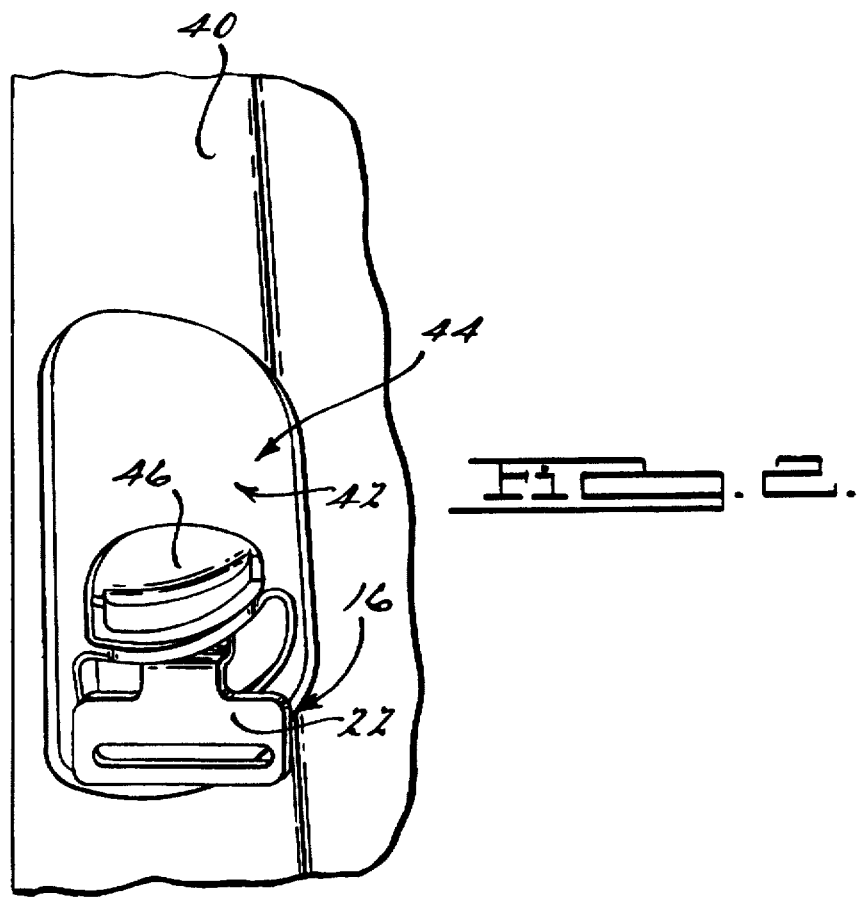
FIG. 2 is a side view of the guide ring mounting of the seat belt assembly of FIG. 1.

Turing now to FIGS. 2 and 3, the guide ring assembly 16 includes a D-ring 22 fixedly secured by a nut 24 and a bolt 26 to a slideable carrier assembly 28. The carrier assembly 28 is mounted for sliding vertical movement on a track 30 and is selectively engageable with an anchor plate 32. The track 30 and the anchor plate 32 are fixedly secured with a pillar indicated generally at 34. The track 30, the anchor plate 32 and the pillar 34 may be secured together in fixed relationship as by welding in the configuration shown in FIG. 2. For purposes of understanding the present invention, it is important to know that the guide ring 22 pivotably mounted on the bolt 26 is fixedly secured to the pillar 34 through operation of the carrier assembly 28.

Figure 4:
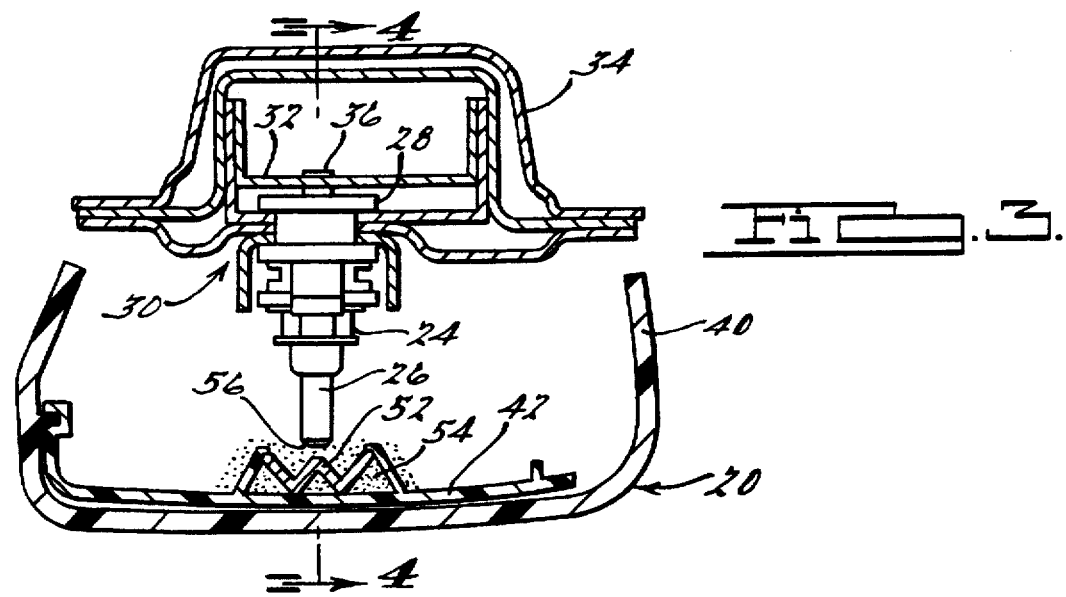
FIG. 4 is a cross section taken along line 4—4 of FIG. 3.
Figure 5:
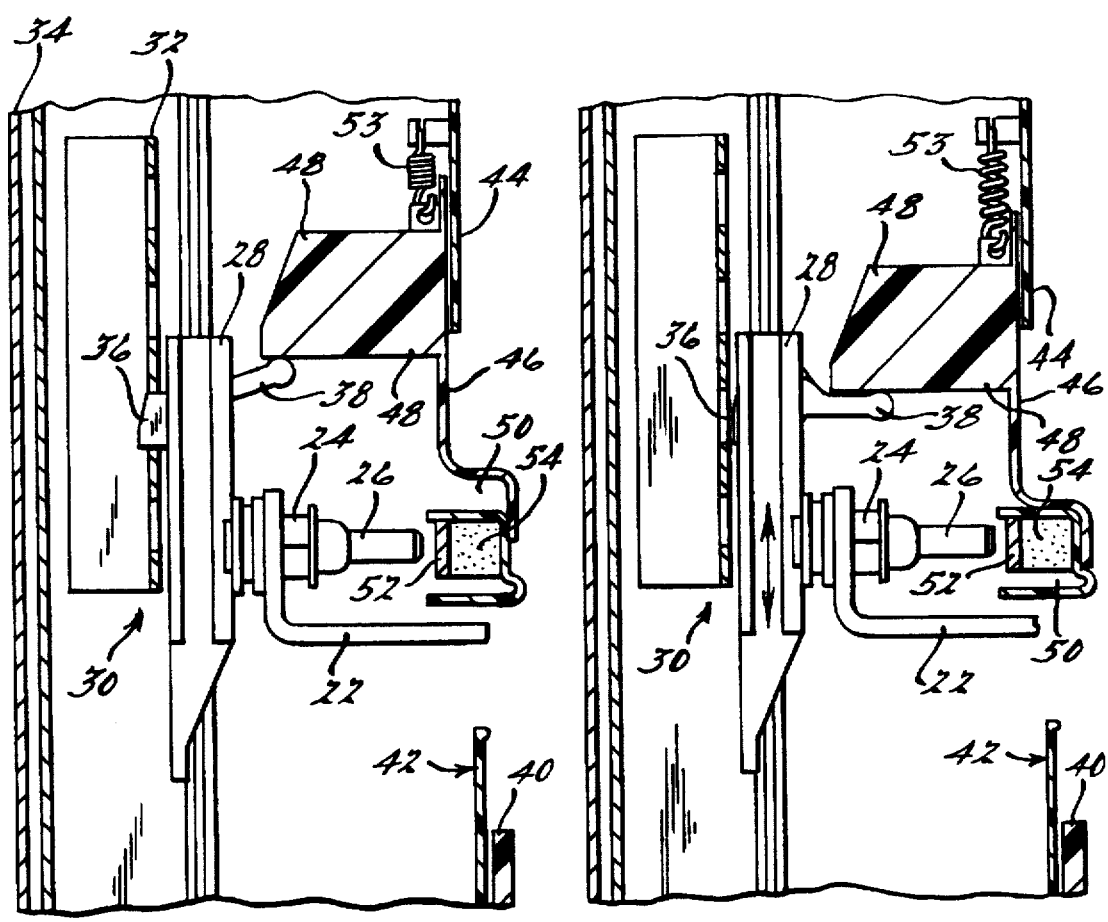
FIG. 5 is a cross-sectional view similar to FIG. 4 showing the guide ring actuated for vertical movement.

The carrier assembly 28 includes a known latch mechanism including a striker 36 and an operator 38 movable ween the latched position shown in FIG. 3 and FIG. 4 and the unlatched position shown in FIG. 5 to permit the vertical movement of a carrier assembly 28 along the track 30.

Movement of the operator 38 is effected through movement of the trim cover assembly 20. The trim cover 20 includes an outer fixed member 40 fixedly secured to the pillar 34 and an inner moveable member 42. The moveable member 42 includes a primary moveable member 44 and a secondary moveable member 46. The secondary moveable member 46 includes an actuating finger 48 abuttingly engageable against the operator 38. The secondary moveable member 46 also includes a pocket 50 in which is received a W-shaped spring clip 52 which may be encapsulated in or supported on foam as indicated at 54 where foam is depicted as adjacent the clip 54. In embodiments in which foam 54 is illustrated, such illustration is a schematic illustration and not specific to size, shape or location. Occupants of the vehicle wishing to vertically adjust the position of the D-ring 22 and the seat belt 14 manually depress the secondary movable portion 46 against the influence of an extension spring 53 disposed between the secondary moveable portion 46 and the primary moveable portion 44 to actuate the operator 38 and withdraw the latch member 36 from the anchor plate 32. Holding the secondary member 46 and the actuating member 38 in the position shown in FIG. 5 permits vertical movement of the D-ring 22 with the respect to the pillar 18. effected by driving the carrier assembly 28 through the operator 38 in the downward direction as shown in FIGS. 4 and 5. The secondary movable portion 46 abuts the operator 38 so that the carrier assembly 28 may be moved downwardly. It will be noted that during vertical movement of the carrier assembly 28 the clip 52 remains in juxtaposition with the bolt 26 and the nut 24.

The W-shaped configuration of the clip 52 presents an energy absorbing structure to the inner end 56 of the bolt 26. The configuration of the clip 52 is shown to be substantially larger than the cross sectional area of the end of bolt 26 to cushion any impact therebetween. In embodiments in which foam 54 is utilized, the cushioning effect is enhanced. While only one embodiment of the seat belt assembly of the present invention has been described others may occur to those skilled in the automotive body restraint arts which do not depart from the scope of the following claims.

What is claimed is:

1. An adjustable mounting mechanism for a seat belt guide ring carried within a body of an automotive vehicle, the body having an interior, comprising:

a vertically extending track mounted on the interior of the body of the vehicle;

a guide ring assembly slidably mounted on said track and selectively vertically moveable therealong between vertical positions and including a bolt projecting inwardly toward the body interior and carrying a guide ring thereon;

a trim cover assembly mounted in overlying relationship with respect to said track and said guide ring assembly and including a fixed member mounted on the interior of the vehicle body and a moveable member slidably engaging said fixed member and having an actuating finger operatively engageable with said guide ring assembly to selectively effect vertical movement of said guide ring assembly along said track; and a cushion member carried with said moveable member in facing relationship with said bolt, said cushion member being positioned at all vertical positions of said guide ring assembly between said bolt and the interior of the body.

2. A mounting mechanism as defined in claim 13, wherein said cushion member carried with said moveable member, said moveable member having an inner side, comprises a spring clip mounted on said moveable member inner side.

3. A mounting mechanism as defined in claim 2 and further comprising energy absorbing foam adjacent said clip.

4. A mounting mechanism as defined in claim 2 wherein said spring clip is formed in a W-shaped configuration.

5. A mounting mechanism as defined in claim 3 and further comprising energy absorbing foam surrounding said clip.

6. A mounting mechanism as defined in claim 3 herein said clip defines a cross sectional area greater than the cross section of said bolt.

7. An adjustable mounting mechanism for a seat belt guide ring carried within a body of an automotive vehicle, the body having an interior, comprising:

a vertically extending track mounted on the interior of the body of the vehicle;

a guide ring assembly slidably mounted on said track and selectively vertically moveable therealong between vertical positions and including a bolt projecting inwardly toward the body interior and carrying a guide ring thereon;

a trim cover assembly mounted in overlying relationship with respect to said track and said guide ring assembly and including a fixed member mounted on the interior of the vehicle body and a moveable member slidably engaging said fixed member and having an actuating finger operatively engageable with said guide ring assembly to selectively effect vertical movement of said guide ring assembly along said track;

means defining a pocket in said moveable member; and a cushion member carried in said moveable member pocket in facing relationship with said bolt, said cushion member being positioned at all times between said bolt and the interior of the body.

8. A mounting mechanism as defined in claim 7, wherein said cushion member carried with said moveable member, said moveable member having an inner side, comprises a spring clip mounted on said moveable member inner side.

9. A mounting mechanism as defined in claim 8 wherein said spring clip is formed in a W-shaped configuration.

10. A mounting mechanism as defined in claim 9 and further comprising energy absorbing foam surrounding said clip within said pocket.

11. A mounting mechanism as defined in claim 8 and further comprising energy absorbing foam adjacent said clip within said pocket.

12. A mounting mechanism as defined in claim 9 wherein said clip defines a cross sectional area greater than the cross section of said bolt.

* * * * *